UNITED STATES PATENT OFFICE.

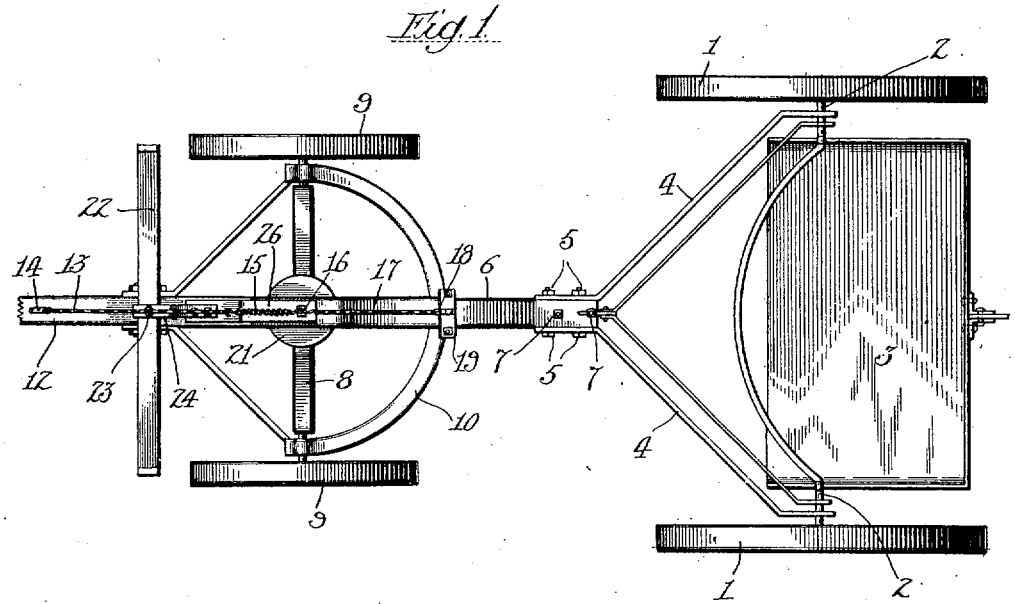

JOHN E. CULVER, OF LOS ANGELES, CALIFORNIA.

SCRAPER.

No. 857,269. Specification of Letters Patent. Patented June 18, 1907.

Application filed November 12, 1906. Serial No. 343,141.

*To all whom it may concern:*

Be it known that I, JOHN E. CULVER, a citizen of the United States, residing at Los Angeles, in the county of Los Angeles and State of California, have invented new and useful Improvements in Scrapers, of which the following is a specification.

This invention relates to scrapers and the object of the invention is to provide a device which may be attached to a two wheeled scraper in which the scraping blade and all appurtenances are supported by the two wheels of the scraper, the device when attached to the two wheeled scraper preventing the vibrations and varying strains on the scraping blade from being imparted to the tongue. This affords the advantage, in this respect, of a four wheeled scraper when the device is attached, and yet does not render the scraper useless as a two wheeled scraper but leaves it complete and operable if desired as a two wheeled scraper when the device is removed.

Further objects and advantages will be brought out in the following description.

The accompanying drawings illustrate the invention, and referring thereto:—Figure 1 is a plan view of the device applied to a two wheeled scraper, the scraper being shown completely in detail. Fig. 2 is a side elevation of what is shown in Fig. 1.

1 designates scraper wheels mounted on shaft 2, from which is hung the scraper 3. Extending forward from shaft 2 are frame bars 4 which are united by bolts 5. The device which is adapted to be connected to the two wheeled scraper in place of the rigid tongue consists of a gooseneck 6 comprising two bars is fastened by bolts 7 to the bars 4. 8 is a front axle with wheels 9. The hounds 10 extend back and are connected by bolt 11 with the rear end of the tongue 12, the tongue 12 extending forward over the axle 8 and being supported by a chain 13 connected to a hook 14 on the tongue 12, the other end of the chain 13 being connected by a spring 15 with the upper end of an eye bolt 16. The eye bolt 16 is connected by a chain 17 with a hook 18 fastened by a clamp 19 to the gooseneck 6. The eye bolt 16 is an upward extension of the king-bolt 20 and thus the distance between the eye bolt 16 and hook 14 is always the same, no matter what position the tongue 12 is turned into in swinging around. 21 is a fifth wheel arranged under the front end of gooseneck 6. A whiffletree 22 is connected to the tongue 12, its pin 23 passing through the tongue and through a brace 24, which brace is clamped to the tongue 12 by bolts 25, which bolts also serve to clamp a brace 26 which extends back and lies over the front end of goooseneck 6 and under the head of the king-bolt 20.

In operation the spring 15 permits the tongue 12 to swing vertically without imparting jerks to it. When the device is attached to bars 4 any side vibrations or jars of the scraper are transmitted by the bars 4 to the goose-neck 6 and are dissipated at the front truck, *i. e.*, wheels 9, axle 8 and associated parts and thus there is no side vibration of any moment imparted to the tongue 12, thus securing the advantage in this respect of a four wheeled scraper in that the necks of the team are relieved from strain caused by lateral jerks of the tongue. In swinging around, the chain 13 is constantly effective in sustaining the weight of tongue 12 on account of the eye bolt 16 being in line with the king-bolt. If the bolt 16 were not in line with the king-bolt at all times then the chain 13 would be slack at certain positions of the tongue which would allow the tongue to drop.

In the present invention the object is to provide a device which may be applied to two wheeled scrapers by removing the rigid tongue of the scraper which will relieve the teams as much as possible from any unnecessary work and from injurious effects tending to physically impair the efficiency of the team and yet enable the scraper, upon the removal of the device, to be used as a two wheeled scraper in work where the extra length of the scraper with the attachment applied would render the scraper impracticable for use.

What I claim is:—

In combination with a two wheeled scraper in which the scraper and all its appurtenances are carried by the two wheels thereof, of a device adapted to be attached to the scraper in lieu of the rigid tongue of the scraper, which consists of a gooseneck detachably fastened to the frame of the two wheeled scraper, a truck supporting the front end of the gooseneck, and a tongue connected to the truck.

In testimony whereof, I have hereunto set my hand at Los Angeles California this 5th day of November 1906.

JOHN E. CULVER.

In presence of—
GEORGE T. HACKLEY,
FRANK L. A. GRAHAM.